May 13, 1958     E. K. PROCTOR, JR     2,834,962
WAVE GUIDE LENS Filed March 2 1954     4 Sheets-Sheet 1

INVENTOR
EDWARD K. PROCTOR, JR.
BY
ATTORNEY

May 13, 1958   E. K. PROCTOR, JR   2,834,962
WAVE GUIDE LENS
Filed March 2, 1954   4 Sheets-Sheet 2

INVENTOR
EDWARD K. PROCTOR, JR.
BY
Thomas M. Ferrill Jr.
ATTORNEY

May 13, 1958

E. K. PROCTOR, JR 2,834,962

WAVE GUIDE LENS

Filed March 2, 1954

INVENTOR
EDWARD K. PROCTOR, JR.
BY
ATTORNEY

May 13, 1958 E. K. PROCTOR, JR 2,834,962
WAVE GUIDE LENS
Filed March 2, 1954 4 Sheets-Sheet 4

INVENTOR
EDWARD K. PROCTOR, JR.
BY
Thomas M. Ferrill, Jr.
ATTORNEY

United States Patent Office 2,834,962
Patented May 13, 1958

2,834,962
WAVE GUIDE LENS

Edward K. Proctor, Jr., Forest Hills, N. Y., assignor to Sperry Rand Corporation, a corporation of Delaware Application March 2, 1954, Serial No. 413,577

22 Claims. (Cl. 343—909)

The present invention relates to achromatic electromagnetic wave guide lenses.

Wave guide lenses heretofore known in the art have been subject to excessive chromatic aberration (changes in operating characteristics with alterations in frequency) because of the fact that the refractive indices of the wave guide channels thereof vary with frequency. The variation in refractive index of a wave guide as the operating frequency is altered is called dispersion. The shape of a microwave lens and the refractive indices of the wave guide channels thereof are generally predetermined to produce a required focussing action at a single frequency. Since the refractive indices vary with frequency, such a lens cannot be operated over a wide frequency band without being subject to chromatic aberration.

It is sometimes desirable for a wave guide lens to be zoned (to thereby minimize its thickness) without introducing physical impedance discontinuities in a surface thereof. This may be achieved by constructing the lens so that the different wave guide channels thereof have different effective refractive indices at the lens operating frequency. This type lens is generally referred to as a variable refractive index lens, i. e., different channels of the lens have different refractive indices at a particular frequency.

Both variable index of refraction wave guide lenses and lenses where all of the wave guide channels thereof have the same refractive index (constant index of refraction lenses) are subject to chromatic aberration as aforedescribed. In a lens of either type designed, for example, to focus energy of one frequency at one point, energy at other frequencies may be approximately focussed at different points or may not be satisfactorily focussed at all. Since lenses are frequently required to perform over a relatively broad band of frequencies without relocation of transmitting or receiving devices placed at the focal point and without deterioration of focussing properties, changes in the lens operating characteristics as described above are disadvantageous.

Furthermore, if a lens is zoned as described above, it will also be subject to chromatic aberration due to zoning or step phase errors which occur between the adjacent zones with changes in operating frequency. For a ten percent change in wavelength and a lens having five zones from its center to its outer edge, for example, step phase errors cause the phase fronts of the waves from the outer zone or step to be out of phase with the phase fronts at the center of the lens by a half wavelength at the new frequency. This occurs whether zoning is produced by physical steps in a face of the lens as in constant refractive index lenses, or by distribution of the indices of refraction of the wave guide channels as in variable refractive index lenses.

Sometimes it is desirable to design the wave guide channels of any of the aforedescribed types of lenses so that the lens design frequency is close to the cut-off frequencies of the wave guide channels. This increases the critical angle of incidence of the lens (the angle at which wave energy incident upon an interface of the wave guide channels of the lens as measured from a line perpendicular to the interface will be subject to multiple reflections and diffractions). The critical angle is increased because the ratios of the distances "$a$" between walls of each wave guide measured in the plane of the magnetic field therein to the free space operating wavelength $\lambda_0$ are decreased as the wave guide channels are operated closer to cut-off.

Operation of the wave guide channels closer to cut-off, however, causes the lens to be more frequency sensitive because the refractive indices thereof are subject to increased dispersion. This is evident from the fact that the refractive index of any wave guide is $$n = \sqrt{\epsilon - \left(\frac{f_c}{f}\right)^2}$$

where $\epsilon$ is the dielectric constant of the wave guide medium, $f_c$ is the wave guide cut-off frequency, and $f$ is the operating frequency.

It is, therefore, an object of the present invention to provide a broad band wave guide lens in which chromatic aberration is reduced.

It is another object of the present invention to provide a wave guide lens as aforedescribed having a relatively wide critical angle of incidence.

It is a further object of the present invention to provide a broad band variable refractive index wave guide lens in which chromatic aberration is not only reduced but substantially eliminated over a predetermined frequency band.

These and other objects and advantages of the present invention which will become apparent to those skilled in the art are attained by providing a lens structure comprising a plurality of ridged wave guide channels. The ridge means of the wave guide channels extend from the illuminated to the exit interfaces of the lens to lower the cut-off frequencies of the channels and reduce chromatic aberration due to dispersion of the refractive indices of the wave guide channels with changes in operating frequency. A predetermined critical angle of incidence can be maintained since the distances between the wave guide walls can be kept relatively small with respect to the operating wavelength $\lambda_0$.

In the variable refractive index lens provided in accordance with the present invention the use of ridge loading means therein renders a desired distribution of the effective indices of refraction of the ridge loaded wave guide channels readily obtainable because of the many ways of varying the loading. By proper proportioning the lengths of two differently loaded regions in each channel having different phase velocities and different refractive indices $n_1$ and $n_2$, for example, a required value of effective refractive index or mean phase velocity in each channel to provide a predetermined lens focussing action can be obtained. Furthermore, chromatic aberration due to dispersion may be substantially eliminated over a predetermined range of frequencies by relating the rates of change of the refractive indices $n_1$ and $n_2$ properly in accordance with the disclosure below.

Chromatic aberration due to errors caused by zoning or stepping of the lens is also minimized by loading groups of wave guide end sections of each lens zone in a different manner from one full zone to another. The different loading means are adapted to cause the rate of change of refractive index with frequency of one group of end sections in one zone to be properly different from the rate of change of the refractive index of another group of end sections of an adjacent zone so as to compensate for chromatic aberration due to zoning errors in phase of energy output from zone to zone with changes in frequency.

Referring to the drawings.

Figures 1, 2, 3:
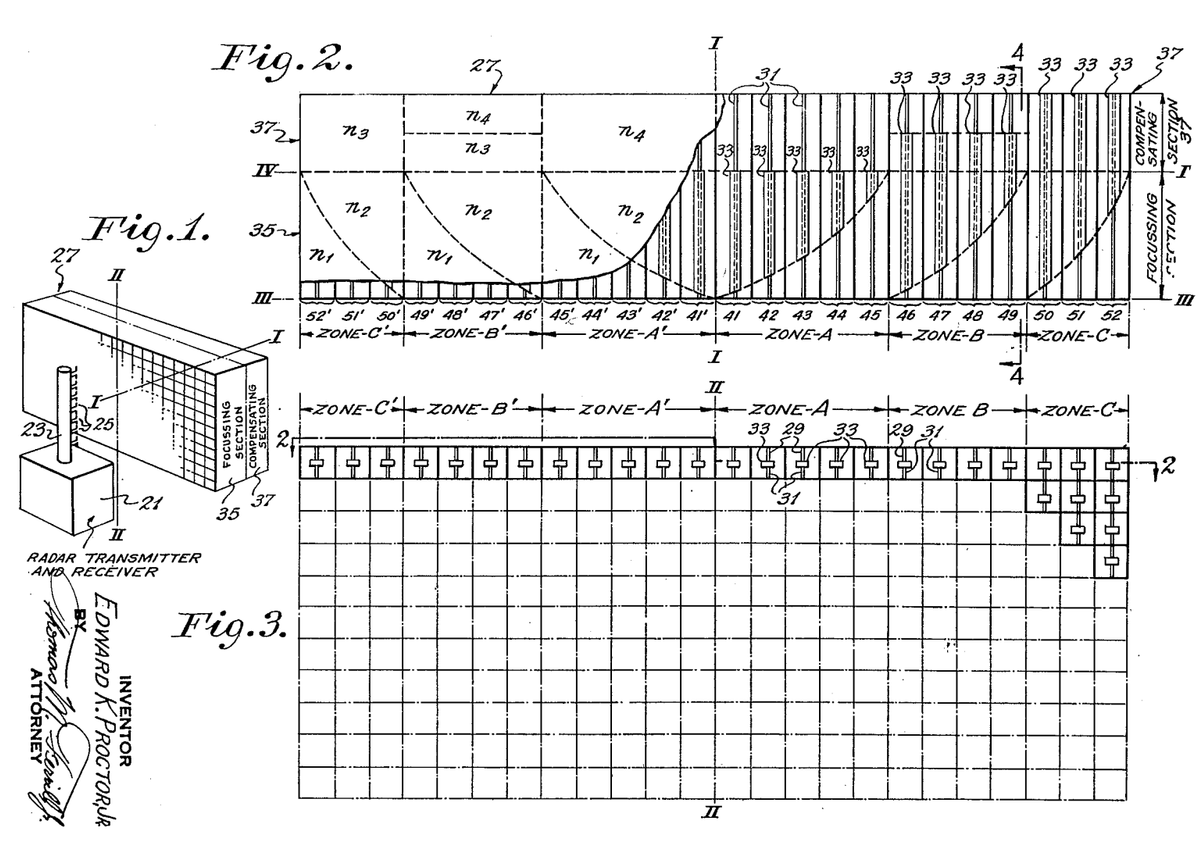
Fig. 1 is a perspective view of an antenna system employing a variable refractive index lens designed in accordance with the present invention.
Fig. 2 is a plan view, partly broken away at the top of the lens shown in Fig. 1.
Fig. 3 is a front view of the surface of the lens illuminated by the dipole antennae shown in Fig. 1.

Referring to Fig. 1, an antenna system for a radar transmitter and receiver 21 is shown, comprising an antennae feed line 23, a plurality of vertically aligned dipoles 25 coupled to feed line 23, and a lens 27. The antennae feed line 23 may comprise any conventional transmission line coupled to the radar transmitter for supplying microwave energy to the dipoles 25 so that energy radiated therefrom will be in the proper phase and comprise vertically polarized electromagnetic waves having uniformly curved phase fronts in a horizontal plane and linear phase fronts in a vertical plane. The feed line 23 is coupled to the radar receiver in any conventional manner so that the system will receive as well as transmit electromagnetic energy. A line through the vertical arms of the dipole antennae 25 comprises the focus of the lens 27, the dipoles being symmetrically arranged above and below the axis I—I of the lens.

Referring to Figs. 2 and 3, the lens 27 consists of a plurality of rectangular wave guide channels or cells of the same cross-sectional dimensions. Each channel comprises a metal tube, and each tube includes metallic ridges 29 and 31 extending from one end to the other along the upper and lower tube walls, respectively. All of the wave guide channels or cells are of the same length so that the lens interfaces lie in planes perpendicular to the axis I—I.

The face of the lens illuminated by the antennae 25 is shown in Fig. 3. The adjacent wave guide channels in any horizontal layer on either side of a vertical plane through the axis II—II in Fig. 3 are differently loaded thereby having different mean phase velocities and different effective refractive indices. All of the wave guide channels in a vertical stack of channels shown in Fig. 3 have the same effective index of refraction depending on their spacing from the aforementioned plane through II—II.

In the plan view of Fig. 2, a part of the top is shown broken away to illustrate the interiors of some of the wave guide channels in the top layer of channels in Fig. 3. The view in Fig. 2 is taken along the line 2—2 in Fig. 3, so only portions of the lower ridges 31 of the wave guide channels are seen. The wave guide channels of a first group on one side of a vertical plane through the axis I—I in Fig. 2 are designated by the numerals 41, 42, 43, 44 and 45, thereby forming a half-zone A of the lens. The channels designated by numerals 46, 47, 48 and 49 form a half-zone B of the lens, and the channels designated by numerals 50, 51 and 52 form a half-zone C of the lens. Correspondingly primed numerals and letters on the opposite side of the aforementioned plane refer to corresponding wave guide channels and half-zones which are symmetrical about the axis I—I with the channels and half-zones designated by the unprimed numerals and letters.

Half-zones A and A' comprise one full lens zone, half-zones B and B' comprise a second full lens zone, and half-zones C and C' comprise a third full lens zone. The outer boundaries of zones C and C', starting from the front face of the lens 27 at a vertical plane through III—III in Fig. 2 are spaced one wavelength further from the lens focus than the outer boundaries of zones B and B'. Likewise, the outer boundaries of zones B and B' at the front face of lens 27 are spaced one wavelength further from the lens focus than the outer boundaries of zones A and A' in the same plane. The outer boundaries of zones A and A' are one wavelength further from the lens focus than a point along the axis I—I at the front face of the lens.

The two metallic ridges 29 and 31 of each wave guide channel are relatively narrow and of uniform thickness and height. Each ridge is loaded by regularly spaced slots of uniform width. The slots in all of the ridges have the same width and the same spacing, which width and spacing are appreciably less than the wavelength of energy at the operating frequency of the lens. Each wave guide channel is further loaded by a predetermined length of dielectric element 33 supported between its two ridges as illustrated in Figs. 3, 4 and 5.

The depth of the slots in the ridges 29 and 31 of the symmetrical half-zones A and A' is constant and of a first value from the front face of the lens 27 illuminated by the antennae 25 to the ends of dielectric elements 33 at a vertical plane through lines IV—IV in Fig. 2. Beyond this plane the slot depth in the ridges of the wave guide of half-zones A and A' is constant and of a second value larger than the first. In half-zones B and B' the slot depth is also constant and of the aforementioned first value as one progresses from the aforementioned illuminated face toward the exit face of the lens, and changes to a depth of said second value at the ends of the dielectric elements 33 closest to the exit face of the lens. In half-zones C and C', the slot depth is constant and of said first value from the illuminated to the exit faces of the lens. Fig. 4 is a longitudinal sectional view which illustrates the variations in slot depth and dielectric loading in the lens channel 49, for example.

Figure 4:
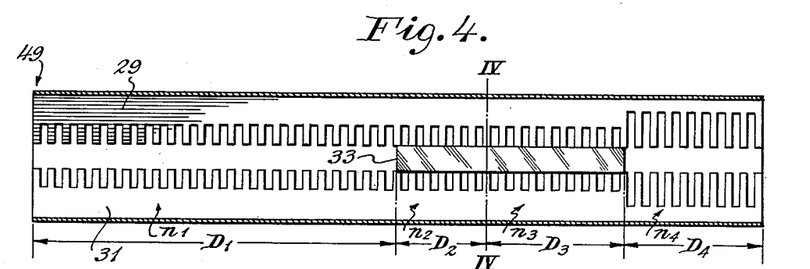
Fig. 4 is an enlarged, longitudinal sectional view of a lens channel taken along the lines 4—4 in Fig. 2.
Figure 5:
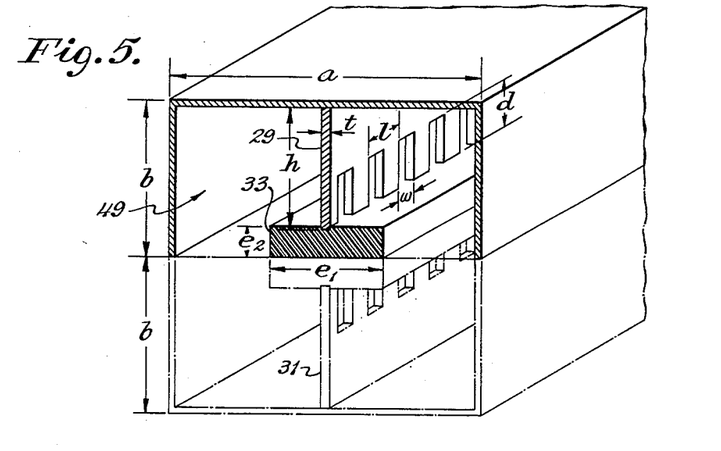
Fig. 5 is an enlarged perspective view of a portion of the wave guide channel shown in Fig. 4.

Referring to Figs. 2 and 4, the regions of the wave guide channels where there are no portions of dielectric elements 33 and where the depth of the slots in the ridges is equal to the aforementioned first value of depth have an index of refraction designated by $n_1$, and lengths $D_1$. The regions of the wave guide channels on one side of a vertical plane through IV—IV closer to the illuminated face of the lens which include portions of dielectric elements 33 have a refractive index designated by $n_2$ and lengths $D_2$. The regions of the wave guide channels on the other side of the vertical plane through IV—IV which include portions of dielectric elements 33 have a refractive index designated by $n_3$ and lengths $D_3$. The refractive indices $n_2$ and $n_3$ are made equal in the illustrated structure for reasons which become apparent below. The regions of the wave guide channels having no dielectric loading elements 33 and where the depth of the slots in the ridges is equal to the aforementioned second value have a refractive index designated by $n_4$ and lengths $D_4$. The terminations of the regions of different refractive index in each wave guide channel are schematically indicated in Fig. 2 by the heavy dashed lines.

The lens shown in Figs. 1–3 is hypothetically divided into a focussing section 35 and a zoning or step phase compensating section 37. Once particular values for $n_1$ and $n_2$ in the focussing section 35 are assigned for a particular frequency ($n_2$ being larger than $n_1$), the focussing section may be adapted to convert incident wave energy from antennae 25 having curved phase fronts in a horizontal plane into wave energy having plane phase fronts at a vertical plane through IV—IV.

The proper conversion of energy is achieved by correctly proportioning the lengths $D_1$ and $D_2$ of the regions of refractive index $n_1$ and $n_2$, respectively, in each channel so that the effective refractive indices of the symmetrical channels are properly different from one symmetrical pair of channels to another. The step phase compensating section 37 is included for reasons which will become more clear below, although it need not necessarily form part of the lens 27.

A large value of $(n_2-n_1)$ is desired in the focussing section 35 of the lens as aforedescribed to minimize the lens thickness. In a lens employing non-ridged wave guide channels this could be obtained, for example, by partially filling the wave guide channels with dielectric material. However, if the wave guide channels are totally filled in cross section, but only partially filled axially, the refractive indices of the non-loaded air-filled regions will be subject to excessive dispersion when operated at wavelengths close to the cut-off dimensions of the air-filled wave guide sections.

It may be desirable for the wave guide channels of the lens to be dimensioned close to cut-off for the operating frequency so that the critical angle of incidence for the lens will be maximized. If energy is incident upon a lens interface at an angle with respect to the normal to the interface which is larger than the aforementioned critical angle, the power transmitted into the lens is greatly reduced. The critical angle of incidence is proportional to the ratio of $a/\lambda_0$, where "$a$" is the distance between the walls of a wave guide as measured in the magnetic plane of electromagnetic wave propagation therein along the interface of the lens, and $\lambda_0$ is the operating wavelength in free space. It has been found that as the aforementioned ratio decreases from a value of the order of 1.0 to a value of the order of 0.5, the critical angle of incidence increases up to a maximum value of the order of 90 degrees. This can be established from theory based on an article entitled "Reflection of an electromagnetic plane wave by an infinite set of plates I," by Carlson and Heins, published in the Quarterly of Applied Mathematics, vol. IV, No. 4, January 1947, pages 313–329.

Therefore, if unloaded air-filled wave guide sections are employed in the lens, the rates of variation in refractive indices thereof with frequency will be excessive if the guides are operated close to cut-off to attain a large critical angle of incidence for the lens. As the ratio of $a/\lambda_0$ is decreased, the refractive index of a wave guide decreases, with the slope of the curve of index of refraction becoming increasingly steep as the wave guide is operated closer to cut-off and the critical angle of incidence becomes larger.

Both a large critical angle of incidence and relatively low rates of variation with frequency of the refractive indices of the wave guide channels of a variable refractive index lens could be obtained by filling the entire axial lengths of non-ridged wave guide channels with dielectric materials of first and second different dielectric constants. Therefore, the distance "$a$" between the walls of a wave guide channel could be made small enough relative to the operating wavelength to permit relatively wide angles of incidence and the electrical distance between such walls would be effectively increased. Thus, the cut-off frequencies of the wave guide channels would be lowered, thereby decreasing the rates of variation of the refractive indices of the channels with changes in frequency. However, such a lens would be impractical because of excessive weight, and the lens would still be subject to chromatic aberration due to the fact that the different regions of different dielectric materials would have incorrectly related rates of variation in refractive index with frequency changes.

Figure 6:
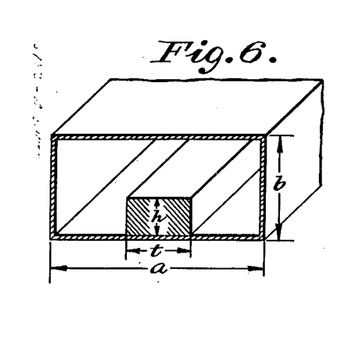
Figs. 6 through 9 are perspective views of various ridge-loaded wave guide structures.
Figure 7:
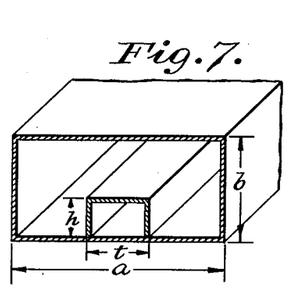
Figure 8:
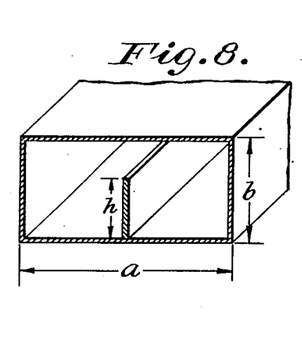

Some of the aforementioned difficulties may be overcome by using ridged wave guide lens channels as described above. Placing a metallic ridge in a wave guide, as is shown in Figs. 6, 7 and 8, for example, has the effect of reducing the cut-off frequency of the wave guide without alteration of the "$a$" dimension thereof. The "$a$" dimension (in the plane of the magnetic field for the dominant mode of operation) of each wave guide in Figs. 6–8 can thereby be independently specified by selecting a ridge of the proper size. In general, for a fixed "$a$" dimension, the cut-off frequency of a ridged wave guide is progressively reduced for the dominant mode of operation as the ridge height "$h$" is increased.

Therefore, if ridged wave guides are used for the lens channels from the front to the back lens faces, as in the lens shown in Figs. 1–3, all of the guides may be operated at frequencies well above cut-off to reduce the rates of variation of the refractive indices thereof with frequency. Furthermore, the ratio of $a/\lambda_0$ can be maintained relatively small, even at a value equal to 0.5 to provide a maximum critical angle of incidence for the lens.

The required variations in refractive index in the different regions of the ridged waveguide channels can also be readily effected in many different ways. Where the "$a$" and "$b$" dimensions of a wave guide are constant, a guide having a ridge of one cross section would have a different refractive index than the same guide having a ridge of another cross section, for example. Furthermore, the ridges could be loaded with a plurality of loading means such as slots, for example, having relatively small dimensions and spacings with respect to the operating wavelength.

Figure 9:
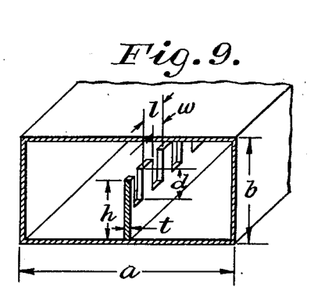

A slot-loaded thin-ridged wave guide is shown in Fig. 9. The refractive index can be changed by varying either the depth dimension "$d$" of the series of slots, the width "$w$" thereof, or the distance "$l$" shown in Fig. 9.

Figure 9A:
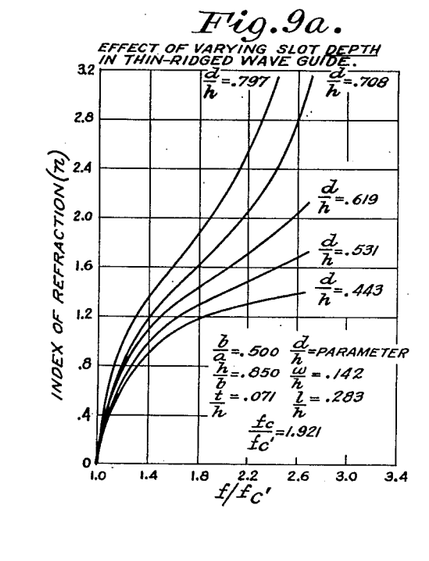
Fig. 9a is a graph showing the variation in index of refraction with frequency of slotted thin-ridged wave guide structures having different slot depths.
Figure 9B:
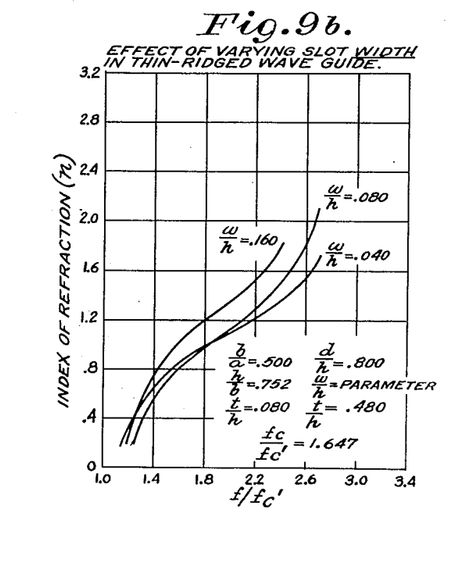
Fig. 9b is a graph showing the variation in index of refraction with frequency of slotted thin-ridged wave guide structures having different slot widths.

Figs. 9a and 9b are graphs which illustrate the variation of refractive index $n$ for a slot-loaded, thin-ridged wave guide as a function of $f/f_c'$. In both of these figures $f_c$ refers to the cut-off frequency of the wave guide in the absence of a ridge, $f_c'$ refers to the cut-off frequency with a non-slotted ridge in place, and $f$ is the operating frequency. The frequency axis, $f/f_c'$, is thus normalized to the cut-off frequency of a non-loaded ridge wave guide. The curves in Fig. 9a illustrate the effects of loading the ridge with slots of different depths, all other dimensions being constant at the relative values illustrated in the graph. In Fig. 9b, the various curves shown illustrate the effects of loading the ridge with slots of different widths, all other dimensions being constant at the relative values illustrated.

The refractive index of a ridged wave guide can also be changed by providing loading means comprising a dielectric element such as element 33 in Figs. 2, 3 and 5, for example. The width of the dielectric element and its dielectric constant are factors which determine how much the loading and refractive index are varied.

In the lens structure 27 shown in Figs. 1–5, of which Fig. 5 is a perspective view of a portion of one of the lens channels 49, it will be noted that each lens channel comprises, in effect, two rectangular wave guides joined together with their common wall removed. All of the channels of lens 27 are of similar construction, thereby reducing the weight of the lens. Such a lens channel is substantially equivalent, electrically, to a wave guide structure comprising two rectangular wave guides including a common wide wall therebetween.

Figure 5A:
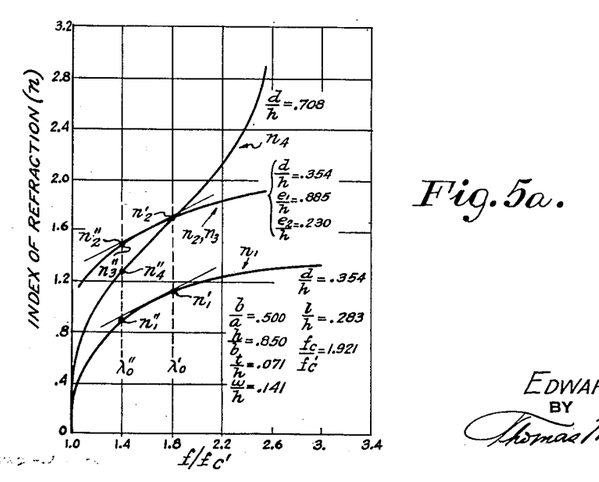
Fig. 5a is a graph showing the variation with frequency of the refractive index of the wave guide channel portion shown in Fig. 5, and the variations with frequency of the refractive indices of all of the various regions in the wave guide channel shown in Fig. 4.

Fig. 5a shows the effect on refractive index $n$ of changing the slot depth in the thin-ridge wave guide of Fig. 5, and the effect of placing a dielectric loading element between the two ridges 29 and 31. The curve designated by $n_2$ and $n_3$ is for the wave guide of Fig. 5 including the dielectric element 33 having a dielectric constant $\epsilon=2.55$. The curve designated by $n_1$ is for the same guide with the same ridge and slots therein, but without the dielectric element 33. The curve designated by $n_4$ is for the same guide as that employed to obtain the curve $n_1$, but with a different slot depth than before. The various relative dimensions of the different wave guide sections and elements included therein are illustrated in Fig. 5a.

In Fig. 5a, the index of refraction $n$ is the ordinate and the ratio of $f/f_c'$ is the abscissa. The frequency axis $f/f_c'$ is normalized to the cut-off frequency of a non-loaded ridged wave guide for the dominant mode of operation having the relative dimensions illustrated in the graph. The curves of refractive index $n_1$, $n_2$, $n_3$ and $n_4$ showing the variations in $n$ with frequency changes are for the regions of the wave guide channels shown in Figs. 2 and 4 having correspondingly designated refractive indices. Although many different curves could be obtained by changing the size and/or dielectric constant of the loading element 33, and/or by changing the various dimensions of the slots and ridges, the particular relative dimensions illustrated in Fig. 5a were chosen for the lens shown in Figs. 1–3 for reasons which will be more apparent below.

Figure 10:
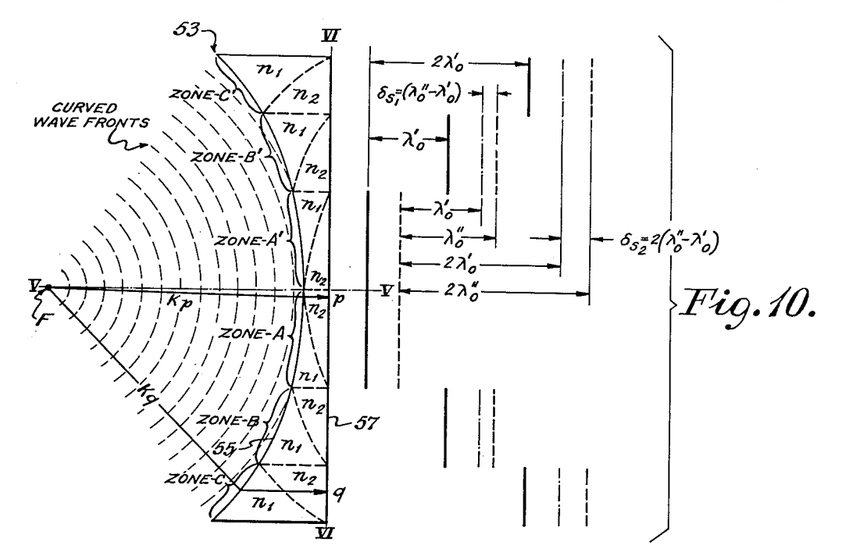
Fig. 10 is a schematic view, for explanatory purposes, of a variable refractive index lens focussing section.

Referring now to Fig. 10, a lens 53 is schematically shown having any predetermined thickness at its center and a curved illuminated surface 55 and a plane exit surface 57. The shape of the surfaces may be arbitrarily chosen. The lens 53 is divided into six half-zones A, B, C, A', B' and C' symmetrically disposed about the axis V—V as illustrated. Each half-zone is divided into regions of different refractive indices $n_1$ and $n_2$. The horizontal dashed lines within the lens configuration define the lens half-zones, the curved dashed lines within each half-zone indicating the divisions between the regions of different refractive index. The letter F indicates the position of a source of electromagnetic wave energy at the focus of the lens. The source at focus F produces vertically polarized waves having curved phase fronts in a horizontal plane with the E vectors of the waves perpendicular to the plane of the drawings.

Each half-zone of the lens shown in Fig. 10 is comprised of a plurality of wave guide channels or paths. Each path within any particular half-zone of the lens has a different effective refractive index $n$ determined by the proportions of lengths $D_1$ and $D_2$ of $n_1$ and $n_2$, respectively, therein. It will be assumed that the refractive index $n_2$ is greater than $n_1$ at any frequency.

Suppose, for example, that the exit face 57 of the lens 53 lies in a plane and the face 55 illuminated by the source at F is curved as shown. For a lens designed to produce a plane phase front, every point on the lens face 57 should be connected to the energy source at the lens focus F by a transmission or ray path $l=K+D$. K is the free space portion, and D the lens portion of the ray path, where $D=D_1+D_2$ in any path. The phase shift along all of the ray paths $l$ must be equal or differ only by integral multiples of 360 degrees to produce the desired plane phase fronts.

The phase shift $\phi$, along a ray path $l$ may be expressed as $$\phi=\frac{2\pi}{\lambda}l=\beta l$$

where $\lambda$ is the wave length in the medium in which the waves are propagating and $$\beta=\frac{2\pi}{\lambda}$$

is the phase constant of the medium. The ray paths $l$ are partially in free space having lengths K, for which the phase constant is $$\beta_0=\frac{2\pi}{\lambda_0}$$

and partially in the lens having lengths D, for which the phase constant is $$\beta_L=\frac{2\pi}{\lambda_L}$$

The wavelength $\lambda_0$ is in free space and $\lambda_L$ is the wavelength in the lens portion. Since $l=K+D$, the lens 53 must be designed so that for any two rays from the focus F following along two arbitrary paths $p$ and $q$ the following equation is satisfied:

$$\beta_0 K_p+\beta_L D_p=\beta_0 K_q+\beta_L D_q \pm 2\pi N \qquad (1)$$

In Equation 1 $K_p$ and $D_p$ are the free space and lens portions, respectively, of a ray path $l_p$ from the focus F through an arbitrary lens path $p$ to the exit surface 57 of the lens, and $K_q$ and $D_q$ have the same meanings for a ray path $l_q$ through a different lens path $q$. $\beta_0$ is the phase constant for electromagnetic waves of wavelength $\lambda_0$ in free space. $\beta_L$ is the mean phase constant for electromagnetic waves within the lens, the term $\beta_L$ differing from one path in the lens to another because of the different effective refractive indices thereof. The term $2\pi N$ expresses the fact that the ray paths $l_p$ and $l_q$ may differ by integral multiples of 360 degrees (depending on which lens zones the paths $l_p$ and $l_q$ pass through). If a particular path considered through the lens of Fig. 10 extends through either zone A or zone A', $N=0$; if the path is through either zone B or B', $N=1$; and if the path is through either zone C or C', $N=2$.

Equation 1 may be divided by $\beta_0$ to yield:

$$K_p+\frac{\beta_L D_p}{\beta_0}=K_q+\frac{\beta_L D_q}{\beta_0}\pm N\lambda_0 \qquad (2)$$

The effective index of refraction of the lens portion of a ray path is $$n=\frac{\beta_L}{\beta_0}$$

Therefore, Equation 2 may be rewritten as:

$$K_p+n_p D_p=K_q+n_q D_q \pm N\lambda_0 \qquad (3)$$

Equation 3 is applicable to a lens of any shape, and is employed to determine the electrical distances along the ray paths from the focus of the lens shown in Figs. 1–3 to the vertical plane through IV—IV in Fig. 2.

Once a lens is designed, $nD$ is fixed for each channel. However, in a double media lens comprising the focussing section 35 of the lens shown in Figs. 1–3, and the lens shown in Fig. 10, for example, $nD=n_1 D_1+n_2 D_2$, where $n$ is the effective refractive index of the lens channel considered. There are many combinations of $n_1$, $n_2$, $D_1$ and $D_2$ which may produce the required values of $nD$. There are some combinations which are better than others from the standpoint of chromatic aberration due to variations of the refractive indices with frequency.

In a double media lens as shown in Figs. 1–3 or Fig. 10, Equation 3 for lens channels such as $p$ and $q$ in different zones becomes:

$$(K_p+n_1' D_{1p}+n_2' D_{2p})-$$
$$(K_q+n_1' D_{1q}+n_2' D_{2q})+N\lambda_0'=0 \qquad (4)$$

where $n_1'$ and $n_2'$ are particular values of refractive indices $n_1$ and $n_2$ at a wavelength $\lambda_0'$. At a new wavelength $\lambda_0''$, the corresponding equation is:

$$(K_p+n_1'' D_{1p}+n_2'' D_{2p})-$$
$$(K_q+n_1'' D_{1q}+n_2'' D_{2q})+N\lambda_0''=\delta \qquad (5)$$

where $n_1''$ and $n_2''$ are new values of the refractive indices $n_1$ and $n_2$, respectively, at a new wavelength $\lambda_0''$, and $\delta$ is the path length error caused by changing the wavelength.

Subtracting Equation 4 from Equation 5 gives:

$$\delta = [(D_{1p} - D_{1q})(n_1'' - n_1') + (D_{2p} - D_{2q})(n_2'' - n_2')] + [N(\lambda_0'' - \lambda_0')] \quad (6)$$

Equation 6 is composed of two parts. Let $$\delta_d = [(D_{1p} - D_{1q})(n_1'' - n_1') + (D_{2p} - D_{2q})(n_2'' - n_2')] \quad (7)$$

and $$\delta_s = N(\lambda_0'' - \lambda_0') \quad (8)$$

Therefore, $\delta = \delta_d + \delta_s$. The error $\delta_d$ is produced solely by dispersion of the refractive indices $n_1$ and $n_2$ of the wave guide channels when the operating wavelength varies, and the error $\delta_s$ is produced by step phase errors with frequency variations due to the zoning of the lens.

In order for no error to occur because of dispersion of the refractive indices, Equation 7 may be set equal to zero. Letting $\Delta n_1 = (n_1'' - n_1')$ and $\Delta n_2 = (n_2'' - n_2')$ gives:

$$\Delta n_1 = -\Delta n_2 \left( \frac{D_{2p} - D_{2q}}{D_{1p} - D_{1q}} \right) \quad (9)$$

If wave guide channel ($p$) is in the region of the center of the lens where $D_{1p} = 0$ and $D_{2p} = D_0$, where $D_0$ is the lens thickness at the center, Equation 9 reduces to:

$$\Delta n_1 = \Delta n_2 \frac{(D_0 - D_{2q})}{D_{1q}} \quad (10)$$

For a lens of constant thickness where both the illuminated and exit surfaces are planar, as shown in Figs. 1–3, $D_0 - D_{2q} = D_{1q}$, so Equation 10 reduces to:

$$\Delta n_1 = \Delta n_2 = (n_1'' - n_1') = (n_2'' - n_2') \quad (11)$$

Equations 9, 10 and 11 specify the relative slopes of a line between $n_1'$ and $n_1''$ on a refractive index curve $n_1$, and a line between $n_2'$ and $n_2''$ on a refractive index curve $n_2$ which will substantially eliminate chromatic aberration due to dispersion errors $\delta_d$ over a band of wavelengths from $\lambda_0'$ to $\lambda_0''$. Equation 9 is the general equation which is applicable to a lens of any shape, and should be satisfied to minimize dispersion errors $\delta_d$ over a wide frequency band.

In order to properly design the achromatic focussing section 35 of the lens 27 shown in Figs. 1 and 2, which section has a constant thickness, the slope of the line between $n_1'$ and $n_1''$ should be equal to the slope of the line between $n_2'$ and $n_2''$ on the curves of the refractive indices $n_1$ and $n_2$. Therefore, once the values of $n_1'$ and $n_2'$ at a particular design frequency are determined, two curves of refractive index versus frequency for the wave guide regions $d_1$ and $d_2$ in each channel must be found where $n_1' - n_1'' = n_2' - n_2''$. The curves for $n_1$ and $n_2$ shown in Fig. 5a have regions therealong which have the same slopes between wavelengths $\lambda_0'$ and $\lambda_0''$ as illustrated. Therefore, if the operating wavelength is changed from $\lambda_0'$ to a larger wavelength $\lambda_0''$, there could be substantially no chromatic aberration errors produced in the focussing section 35 of the lens 27 due to dispersion. Obviously, since the curves of $n_1$ and $n_2$ over a corresponding wavelength band to the right of $\lambda_0'$ in Fig. 5a have equal slopes, compensation would also be produced if the operating wavelength were to decrease.

If one of the lens faces were curved, as in Fig. 10 for example, $\Delta n_1$ would not be equal to $\Delta n_2$. Therefore, to minimize dispersion errors, curves of refractive index having the proper relative slopes over the required frequency band as determined by Equation 9 must be obtained. For any particular lens having a predetermined shape for operation over a predetermined frequency band the curves of refractive index of ridge wave guide regions of refractive index $n_1$ and $n_2$ may be determined empirically in order to satisfy Equation 9. A wide variety of curves of refractive index versus frequency having various slopes may be obtained by suitable variations of $l$, $w$, or $d$ in a slot-loaded ridge wave guide as shown in Fig. 5, and/or by suitable variations in $e_1$, $e_2$ or the dielectric constant of element 33. Some of these curves have been shown in Fig. 5a, Fig. 9a and Fig. 9b, for example.

The plane phase fronts of the waves of wavelength $\lambda_0'$ at the outputs of the six half-zones of the lens 53 are schematically shown in Fig. 10 by the solid lines to the right of the lens. At a wavelength $\lambda_0'$, the phase fronts are displaced by one wavelength from one zone to another as illustrated. If the focussing section 35 of the constant thickness lens of Figs. 1–3 were designed on the same principles as above for wavelength $\lambda_0'$, the phase fronts at the output of the focussing section 35 would also be similar to those shown in Fig. 10. If the frequency changes to establish a new wavelength $\lambda_0''$, the phase fronts will all shift by equal increments, assuming there is no error due to dispersion of the refractive indices of the lens.

If the frequency is decreased and the wavelength increased to $\lambda_0''$, for example, the phase fronts at the outputs of the lens half-zones would be displaced to the right in Fig. 10. The phase fronts of the waves at a wavelength $\lambda_0''$ are indicated in Fig. 10 by the dot-dashed lines at the outputs of zones B, B', C and C' and the dashed lines at the outputs of zones A and A'. These phase fronts are all shifted by equal increments, so that the spacings between the phase fronts are still integral multiples of the wavelength $\lambda_0'$ from one zone to another. However, it is desired that the differences between the phase fronts from one zone to another at the new wavelength $\lambda_0''$ be equal to integral multiples of $\lambda_0''$. Therefore, the phase fronts of the waves at the outputs of zones B, B', C and C' should be shifted to the positions of the dashed lines opposite these zones.

The aforementioned zoning phase errors may be substantially reduced by including a compensating section of fixed length S at the end of the lens. In the lens 27 shown in Figs. 1–3, the compensating section comprises properly loaded continuations of the ridged wave guide channels at the output of the focussing section 35 of the lens. For explanatory purposes, the lens 27 is schematically shown in Fig. 11.

Figure 11:
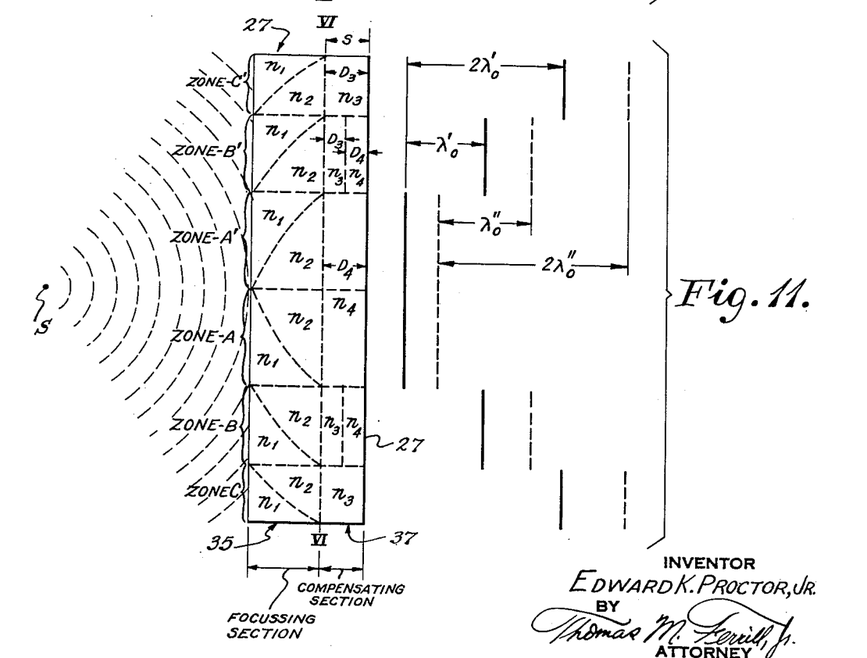
Fig. 11 is a schematic view, for explanatory purposes, of the lens shown in Figs. 1–3 which is compensated for chromatic aberration due to dispersion and chromatic aberration caused by zoning the lens.

Referring to Fig. 11, let S be divided into lengths $D_3$ and $D_4$ (having refractive indices $n_3$ and $n_4$) in various zones such that:

$$S = D_3 + D_4 \quad (12)$$

The lengths $D_3$ and $D_4$ may vary from zone to zone but not within a zone. If $n_3$ equals $n_4$ at the wavelength $\lambda_0'$, as is the case in the lens of Figs. 1–3 (see Fig. 5a), the net effect of the added section at the wavelength $\lambda_0'$ is to advance the phase fronts of all the zones of the lens by a uniform amount, if $n_3 = n_4 > 1$, or retard the phase fronts of all the zones by a uniform amount if $n_3 = n_4 < 1$. The amount of the advancement or delay of the phase fronts is $n_3'S = n_4'S$ at the wavelength $\lambda_0'$. However, if $n_3 \neq n_4$ at a new wavelength $\lambda_0''$, the phase fronts of the waves from a given zone will be altered by an amount depending on the relative lengths of $D_3$ and $D_4$ therein, and compensation for zoning errors can be effected.

For zero step-phase error at a new wavelength $\lambda_0''$, $$n_4''S - (n_3''D_3 + n_4''D_4) + \delta = 0 \quad (13)$$

Subsituting from Equations 8 and 12, $$n_4''S - (n_3''D_3 + n_4''S - n_4''D_3) + N(\lambda_0'' - \lambda_0') = 0 \quad (14)$$

Equation 14 can be solved to yield:

$$D_3 = N \left( \frac{\lambda_0' - \lambda_0''}{n_4'' - n_3''} \right) \quad (15)$$

For half-zones A and A' of the lens, where $N=O$, Equation 15 gives $D_3=0$. For $N=N$ max, where N max is the largest value of N for which compensation is desired ($N=2$ in the illustrated lens of Figs. 1–3), $$D_3 = N \max\left(\frac{\lambda_0' - \lambda_0''}{n_4'' - n_3''}\right) = S \qquad (16)$$

It is not essential that $n_3 = n_4$ at $\lambda_0'$, provided the slopes of the $n_3$ and $n_4$ curves versus frequency are different. However, in a constant thickness compensating section as illustrated in Figs. 1–3 and Fig. 11, $n_3$ should preferably equal $n_4$ at $\lambda_0'$ in order to avoid complications in design of the focussing section 35 of the lens of Figs. 1–3. Therefore, the curves of refractive index in the wave guide regions having refractive indices $n_3$ and $n_4$ in the compensating section 37 of the lens shown in Figs. 1–3, cross each other at the wavelengths $\lambda_0'$ as shown in Fig. 5a. The curve of $n_3$ may be the same as the curve of $n_2$, so the ridged wave guide lengths $d_3$ of the compensating section of the lens 27 in Figs. 1–3 may be loaded the same as the lengths $d_2$ therein. Therefore, the loading of the ridged wave guide sections of the compensating section having refractive indices $n_4$ are preferably chosen so that the curve of refractive index of $n_4$ has a different slope from $n_3$ in the proper direction for compensation, and crosses $n_3$ at the operating wavelength $\lambda_0'$, where $f/f_c'$ is 1.8, for example. Other suitable curves to satisfy Equation 16 for any particular lens design may be obtained empirically.

Although the particular lens illustrated in Figs. 1–3 comprises a constant thickness lens in the form of a parallelepiped excited by a line source of microwaves, it should be apparent that the present invention is equally applicable to any generally similar wave guide lens regardless of the shape thereof, the type source of microwaves employed therewith, or the particular type phase front desired to be produced from the incident lens energy.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave lens, comprising a plurality of wave guide channels forming a cellular lens structure, the effective refractive indices of said channels and electrical lengths thereof being predetermined so that the lens converts incident electromagnetic wave energy of a predetermined frequency and phase front into exit wave energy having a different phase front, and conductive ridge means in each wave guide channel extending from the region of one lens face to another lens face to thereby load said wave guide channels and effectively lower their cut-off frequencies and reduce chromatic aberration due to dispersion of said effective refractive indices with frequency variation.

2. A microwave lens as defined in claim 1, wherein each of said wave guide channels includes at least two metallic ridges protruding into the interior thereof in directions parallel to the electric vectors of electromagnetic energy propagation therein.

3. A microwave lens as defined in claim 2, wherein each wave guide channel comprises a rectangular wave guide.

4. A microwave lens as set forth in claim 1, wherein portions of the ridges of said wave guide channels are loaded with slots, the depth, width, and spacing of said slots being small compared to the operating wavelength of said lens structure.

5. A microwave lens, comprising a plurality of electromagnetic wave guide tubes forming a cellular lens structure, said structure comprising means for converting free space wave energy of wavelength $\lambda_0$ having a first predetermined phase front into wave energy having a different predetermined phase front, the distances "$a$" between walls of said tubes along the illuminated and exit interfaces of said cellular lens structure being of the order of 0.5 $\lambda_0$ to provide a wide critical angle of incidence for the lens structure, and metallic ridge loading means in each wave guide tube extending from the illuminated to the exit interfaces of the lens structure, said ridge loading means comprising means for lowering the cut-off frequencies of said wave guide tubes to thereby reduce chromatic aberration due to dispersion of said refractive indices with frequency changes.

6. A microwave lens, comprising a plurality of wave guide conduits forming a cellular lens structure, each of said conduits including at least one metallic ridge protruding therein and extending from one conduit end to the other, and means loading a first region in each of said conduits differently from a second region therein so that each of said conduits includes at least two regions of different refractive indices $n_1$ and $n_2$ respectively, the relative proportions of the lengths of the regions of refractive index $n_1$ and $n_2$ being different from one conduit to another conduit to establish a predetermined distribution of effective refractive indices for wave energy incident upon said lens, whereby incident microwave energy of a first phase front is converted into exit microwave energy of a different phase front over a wide band of frequencies above the cut-off frequencies of said wave guide conduits.

7. A microwave lens as set forth in claim 6, wherein said loading means includes a plurality of transverse slots in the ridges of said second regions of said wave guide conduits.

8. A microwave lens as set forth in claim 7, wherein said loading means further includes dielectric elements along said ridges of said second regions of said wave guide conduits.

9. A microwave lens as set forth in claim 8, wherein the ridges of said first regions of said wave guide conduits are loaded by a plurality of transverse slots of different characteristics from the slots in the ridges of said second wave guide regions.

10. A microwave lens as set forth in claim 6, wherein the ridges of each wave guide conduit are loaded from one end to another by a plurality of transverse slots.

11. A microwave lens, comprising a plurality of electromagnetic wave guide channels forming a lens structure for receiving microwave energy of predetermined polarization and operating frequency above the cut-off frequency of said channels, adjacent wave guide channels of said structure having different effective refractive indices at said operating frequency for converting received microwave energy having a first phase front into exit energy having a second phase front, each of said channels including first and second regions of lengths $D_1$ and $D_2$ and different refractive indices $n_1$ and $n_2$ respectively, the variations with frequency in the refractive indices of said two regions being predetermined over a frequency band from $f'$ to $f''$ so that $$\Delta n_1 = -\Delta n_2 \left[\frac{D_{2p} - D_{2q}}{D_{1p} - D_{1q}}\right]$$

wherein $\Delta n_1$ equals the difference between the refractive indices of said first regions at frequencies $f'$ and $f''$; $\Delta n_2$ equals the difference between the refractive indices of said second regions at frequencies $f'$ and $f''$; $D_{1p}$ and $D_{2p}$ equal the lengths of said first and second regions respectively in an arbitrary lens channel ($p$); and $D_{1q}$ and $D_{2q}$ equal the lengths of said first and second regions respectively in a different lens channel ($q$).

12. A microwave lens as set forth in claim 11, wherein said wave guide channels comprise hollow wave guides, and wherein each of said wave guides includes at least one metallic ridge means protruding within the interior thereof to thereby lower the cut-off frequencies of said channels.

13. A microwave lens as set forth in claim 12, further including first means electrically loading said ridge means in each wave guide channel along at least one ridge portion coextensive with one of said first or second regions to thereby provide one of said refractive indices $n_1$ or $n_2$.

14. A microwave lens as set forth in claim 13, further including second means electrically loading said ridge means in each wave guide channel along a second ridge portion coextensive with the other of said first or second regions to thereby provide one of said refractive indices $n_1$ or $n_2$.

15. A microwave lens, comprising a plurality of adjacent wave guide channels forming a lens structure having a plurality of lens zones for converting incident wave energy of predetermined wavelength having a predetermined phase front into output wave energy of a different predetermined phase front, said lens having a predetermined focus along an axis of symmetry therethrough, the microwave paths through said zones from the focus of said lens to the lens face most remote therefrom differing in length by an integral number of wavelengths from one zone to another, said lens having a compensating section including loading means for electrically loading portions of the channels of said lens structure differently from one zone to another so that the rates of variation with frequency changes in the refractive indices of said portions of said wave guide channels are related to substantially reduce chromatic aberration due to zoning phase errors in energy emerging from one zone to another with changes in frequency, the wave guide channels of said compensating section within an inner zone having a refractive index $n_4$ and a length of $D_4=S$, where S is the thickness of said compensating section, the wave guide channels of said compensating section within an outer zone having a refractive index $n_3$ and a length of $D_3=S$, the wave guide channels of said compensating section within a zone intermediate said inner and outer zones having a length S comprised of first and second parts along said axis with refractive indices $n_3$ and $n_4$ and lengths $D_3$ and $D_4$, respectively, and wherein the relationship $$D_3 = N\left(\frac{\lambda_0' - \lambda_0''}{n_4'' - n_3''}\right)$$

obtains for the compensating section in any of said zones, where $\lambda_0'$ equals the operating wavelength at a first frequency, $\lambda_0''$ equals the operating wavelength at a different frequency, and $n_4''$ is a particular value of refractive index $n_4$ at the wavelength $\lambda_0''$, $n_3''$ is a particular value of refractive index $n_3$ at the wavelength $\lambda_0''$, and N is an integer whose value depends on the particular lens zone for which $D_3$ is determined, with $N=0$ for said inner zone, $N=1$ for said intermediate zone and $N=2$ for said outer zone.

16. A microwave lens as set forth in claim 20, wherein said compensating section has a length S, wherein the ridge wave guide portions of said compensating section within a first lens zone have a refractive index $n_4$ and lengths $D_4=S$, wherein the ridge wave guide portions of said compensating section within an outer lens zone have refractive index $n_3$ and lengths $D_3=S$, wherein the ridge wave guide portions of said compensating section within lens zones intermediate said first and said outer lens zones are comprised of first and second parts of refractive index $n_3$ and $n_4$ and lengths $D_3$ and $D_4$ respectively, $D_3+D_4$ being equal to S in said intermediate lens zones, and wherein $$D_3 = N\left(\frac{\lambda_0' - \lambda_0''}{n_4'' - n_3''}\right)$$

in the compensating section of any lens zone, where $\lambda_0'$ equals the operating wavelength at a first frequency, $\lambda_0$ equals the operating wavelength at a different frequency, $n_4''$ is a particular value of refractive index $n_4$ at the wavelength $\lambda_0''$, $n_3''$ is a particular value of refractive $n_3$ at the wavelength $\lambda_0''$, and N is an integer whose value depends on the particular lens zone for which $D_3$ is to be determined.

17. A microwave lens, comprising a plurality of electromagnetic wave guide channels forming a microwave lens structure having a plurality of lens zones, means loading each of said channels so that the channels in each zone have different effective refractive indices in accordance with predetermined distributions of refractive indices in each zone to thereby convert incident wave energy having a predetermined polarization and phase front into output wave energy having a different predetermined phase front, said loading means including means dividing said channels into first and second regions of different refractive indices $n_1$ and $n_2$, respectively, the proportions of the lengths of said different regions in each channel being properly related to establish said predetermined distributions of effective refractive indices in each lens zone, the rates of change in the refractive indices $n_1$ and $n_2$ with frequency being predetermined so that $$\Delta n_1 = -\Delta n_2 \left[\frac{D_{2p} - D_{2q}}{D_{1p} - D_{1q}}\right]$$

where $\Delta n_1$ equals the difference between the refractive indices of said first regions at different operating wavelengths $\lambda_0'$ and $\lambda_0''$, respectively, $\Delta n_2$ equals the difference between the refractive indices of said second regions at said wavelengths $\lambda_0'$ and $\lambda_0''$, respectively, $D_{1p}$ and $D_{2p}$ equal the lengths of said first and second regions, respectively, in an arbitrary lens channel $(p)$, and $D_{1q}$ and $D_{2q}$ equal the lengths of said first and second regions, respectively, in a different lens channel $(q)$ to thereby substantially eliminate chromatic aberration due to dispersion of said refractive indices with frequency over a wavelength band between $\lambda_0'$ and $\lambda_0''$, said wave guide channels further including third regions therein, the third regions of the channels in any lens zone being similarly loaded, the loading of said third regions being different from one zone to another so that the rates of variation in the refractive indices of said third regions in the adjacent lens zones are properly different to compensate for chromatic aberration due to zoning phase errors over said band of wavelengths.

18. A microwave lens as set forth in claim 17, wherein said wave guide channels comprise hollow wave guides, each of said wave guides including a metallic ridge extending along the interior thereof in the plane of said polarization of incident wave energy.

19. A microwave lens as set forth in claim 17, wherein the third regions of said wave guide channels within a first lens zone have a refractive index $n_4$ and lengths $D_4=S$, wherein the third regions of said wave guide channels within an outer lens zone have a refractive index $n_3$ and lengths $D_3=S$, wherein the third regions of said wave guide channels within an intermediate lens zone are comprised of first and second parts of refractive index $n_3$ and $n_4$ and lengths $D_3$ and $D_4$ respectively, and wherein $$D_3 = N\left(\frac{\lambda_0' - \lambda_0''}{n_4'' - n_3''}\right)$$

in said third regions of any lens zone, where $n_4''$ is a particular value of refractive index $n_4$ at the wavelength $\lambda_0''$, $n_3''$ is a particular value of refractive index $n_3$ at the wavelength $\lambda_0''$, and N is an integer whose value depends on the particular lens zone for which $D_3$ is to be determined.

20. A microwave lens, comprising a plurality of adjacent wave guide channels forming a lens structure having a plurality of lens zones for converting incident wave energy of predetermined wavelength having a predetermined phase front into output wave energy of a different predetermined phase front, the microwave paths through said zones from the focus of said lens to the lens face most remote therefrom differing in length by an integral number of wavelengths from one zone to another, and a lens compensating section, said compensating section including loading means for electrically loading portions of the channels of said lens structure differently from one zone to another so that the rates of variation with frequency changes in the refractive indices of said portions of said wave guide channels are related to substantially reduce chromatic aberration due to zoning phase errors in energy emerging from one zone to another with changes in frequency, said wave guide channels including metallic ridges extending along the interiors thereof from one lens face to the other, said ridges being parallel to the electric vectors of electromagnetic energy propagated in said channels.

21. A microwave lens, comprising a plurality of wave guide channels forming a lens structure having first and second faces, loading means extending along the interior of each of said channels between said first and second faces for lowering the effective cut-off frequencies of said channels, and means modifying said loading means so as to regulate the effective refractive indices and electrical lengths of said channels for changing incident electromagnetic wave energy of a predetermined frequency and phase front into exit wave energy having a different predetermined phase front, said loading means effectively lowering the cut-off frequencies of said wave guide channels so as to be well below said predetremined frequency and thus reduce chromatic abberation due to dispersion of said effective refractive indices with changes in frequency from said predetermined frequency.

22. A microwave lens as set forth in claim 21, wherein each of said channels comprises a tubular wave guide, said loading means comprising metallic ridge means in the plane of the electric field vectors in each of said tubular wave guides.

References Cited in the file of this patent
UNITED STATES PATENTS

| | | |
|---|---|---|
| 2,283,935 | King | May 26, 1942 |
| 2,547,416 | Skellett | Apr. 3, 1951 |
| 2,636,125 | Southworth | Apr. 21, 1953 |
| 2,640,154 | Kock | May 26, 1953 |
| 2,747,184 | Kock | May 22, 1956 |

UNITED STATES PATENT OFFICE
Certificate of Correction

Patent No. 2,834,962  May 13, 1958

Edward K. Proctor, Jr.

It is hereby certified that error appears in the printed specification of the above numbered patent requiring correction and that the said Letters Patent should read as corrected below.

Column 2, line 4, for "diffractions" read —diffraction—; column 13, line 74, for "$\lambda_0$" read —$\lambda_0''$—.

Signed and sealed this 14th day of April 1959.

[SEAL]

Attest:
KARL H. AXLINE,
*Attesting Officer.*

ROBERT C. WATSON,
*Commissioner of Patents.*